A. LANG.
HEATING AND COOKING LIQUIDS, SOLID SUBSTANCES, AND MIXTURES
OF LIQUIDS AND SOLID SUBSTANCES.
APPLICATION FILED JULY 21, 1915.
1,178,325.
Patented Apr. 4, 1916.
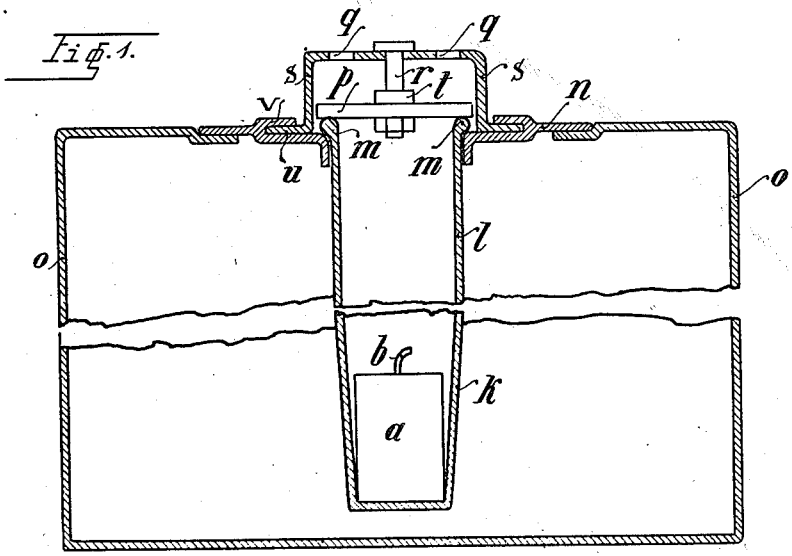
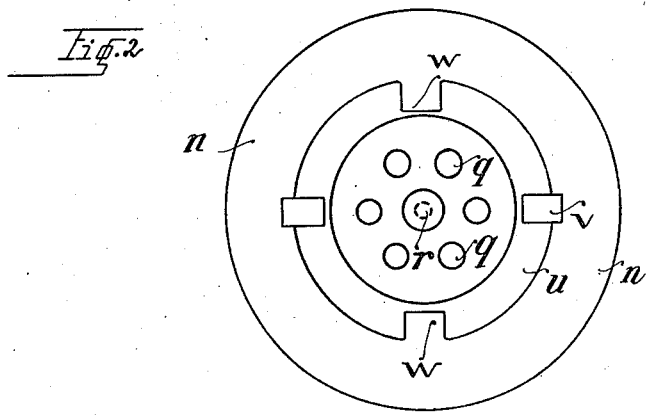

UNITED STATES PATENT OFFICE.

ALBERT LANG, OF KARLSRUHE, GERMANY.

HEATING AND COOKING LIQUIDS, SOLID SUBSTANCES, AND MIXTURES OF LIQUIDS AND SOLID SUBSTANCES.

1,178,325.         Specification of Letters Patent.       Patented Apr. 4, 1916.

Application filed July 21, 1915. Serial No. 41,210.

*To all whom it may concern:*

Be it known that I, Dr. ALBERT LANG, a subject of the Grand Duke of Baden, Germany, residing at Karlsruhe, in Baden, Germany, have invented certain new and useful Improvement in the Heating and Cooking of Liquids, Solid Substances, and Mixtures of Liquids and Solid Substances, of which the following is a specification, reference being had therein to the accompanying drawing.

My invention relates to a device for rapidly heating liquids, or mixtures of liquids and solid substances, or even solid substances themselves. According to the invention the heat of reaction of substances contained in a shell or cartridge is utilized to produce a very high temperature, the reaction being affected by the ignition of metals or metallic substances with bases such as oxygen-carriers or sulfur without the introduction of air combustion.

The heating tube, in which the cartridge is ignited, is conical and caking of the burnt material to the bottom thereof is prevented by a layer of suitable material; the remains of the cartridge can therefore easily be removed from the tube after use. The upper end of the tube may be closed by a lid loosely resting thereon, and a perforated cap can be disposed over the lid, so that any gases developed can escape easily and without obstruction; such gases should be very small in amount in any case. The heating device is not limited therefore in its use as it would be if it could only be employed in cases wherein the evolution of gases did not matter. Hence the device can be used anywhere and by anybody.

In the accompanying drawing: Figure 1 shows a section of a suitable heating or cooking apparatus for use according to the invention. Fig. 2 shows a plan of the cover.

Referring now to Figs. 1 and 2, the heating cartridge $a$ with its fuse $b$ is arranged in the lower conical part $k$ of a tube $l$ provided at its upper end with an enlargement $m$ resting on the edge of an opening in the cover $n$ of the receptacle $o$. On the enlargement $m$ is seated a lid $p$ which by reason of its weight restricts the escape of gases, but is slightly raised if an excess pressure occurs to allow the gases to escape, these subsequently passing out through opening as at $q$ in a cap $s$. The lid $p$ is guided in the cap $s$ by a bolt $r$ and a collar $t$ on the bolt prevents the lid from closing the openings at $q$ when a rapid rise of pressure occurs. The cap $s$ is provided with a flange $u$ held in position by the projections $v$ on the cover $n$, and it can easily be removed by turning it through a quarter turn by means of the notches $w$.

For use, the cover $n$ is placed on the receptacle $o$ after the substances to be heated have been inserted therein, and then the heating tube $l$ is passed through the cover $n$. The heating cartridge is now inserted into the tube and the fuse $b$ may be ignited before doing so. After the cartridge has been inserted the lid $p$ is applied together with the cap $s$ which is secured on the cover $n$: the lid $p$ then rests on the edge of the heating tube, thus closing the latter. The generation of gas, in consequence of the particular composition of the cartridge, is very slow, but should an excess pressure occur, the gas will escape through the openings at $q$ after lifting the lid $p$. If large quantities are to be heated or if the cooking temperature is to be maintained for a long time a number of cartridges may be successively burnt and all subsequently removed together from the tube.

Having now particularly described and ascertained the nature of my said invention and in what manner the same is to be operated, I declare that what I claim is:—

1. In a device of the character described, in combination, a receptacle for the objects to be heated or cooked having a cover, a conical tube, a heating cartridge adapted to be inserted into said tube, a flange at the upper end of said tube resting upon the edge of an opening in said cover, a lid closing the upper end of said tube, a cap secured to the cover and covering said lid and provided with openings for the escape of the heating gases and fumes, escaping from said tube after having lifted the lid, substantially as described.

2. In a heating and cook receptacle of the character described, having a cover, in combination, a conical tube adapted for the reception of a heating cartridge, a flange at the upper end of said tube resting on the edge of an opening in said cover, a lid upon said flange, a cap covering said lid and provided with openings in its upper face for the exhaust of the gases of combustion upon the lifting of said lid by said gases, a bolt and nut for limiting the lifting movement of said lid, a flange on said cap, projections on said cover holding said flange in position, and notches in said flange allowing the passage of said projections for removing the cap, substantially as described.

In testimony whereof I affix my signature in presence of two witnesses.

Dr. ALBERT LANG.

Witnesses:
 RICHARD MEEKS,
 C. INNESS BROWN.